United States Patent
Saward et al.

(10) Patent No.: US 9,672,440 B2
(45) Date of Patent: Jun. 6, 2017

(54) DAMAGE RECOGNITION ASSIST SYSTEM

(71) Applicant: Application Solutions (Electronics and Vision) Ltd., Lewes (GB)

(72) Inventors: Felix Saward, Lewes (GB); Heba Khafagy, Chiswick (GB); Amit Patel, Tunbridge Wells (GB)

(73) Assignee: Application Solutions (Electronics and Vision) LTD., Lewes (GB)

( * ) Notice: Subject to any disclaimer, the term of this patent is extended or adjusted under 35 U.S.C. 154(b) by 0 days.

(21) Appl. No.: 14/948,553

(22) Filed: Nov. 23, 2015

(65) Prior Publication Data
US 2016/0144787 A1 May 26, 2016

(30) Foreign Application Priority Data

Nov. 25, 2014 (EP) .................................... 14194619

(51) Int. Cl.
| | |
|---|---|
| *B60W 30/08* | (2012.01) |
| *B60W 50/14* | (2012.01) |
| *B60W 30/00* | (2006.01) |
| *G06K 9/62* | (2006.01) |
| *H04N 7/18* | (2006.01) |
| *B60W 30/095* | (2012.01) |

(Continued)

(52) U.S. Cl.
CPC ....... *G06K 9/6202* (2013.01); *B60W 30/0956* (2013.01); *B60W 50/14* (2013.01); *H04N 1/215* (2013.01); *H04N 1/2133* (2013.01); *H04N 1/2145* (2013.01); *H04N 7/181* (2013.01); *B60R 2021/0027* (2013.01); *H04N 2201/3253* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,389,340 | B1 * | 5/2002 | Rayner ..................... | B60R 1/00 340/438 |
| 7,307,737 | B1 * | 12/2007 | Kling, III ............... | G01B 11/16 356/614 |
| 9,087,362 | B2 * | 7/2015 | Hertenstein ............ | G06Q 40/08 |

(Continued)

FOREIGN PATENT DOCUMENTS

JP          2008221906          9/2008

OTHER PUBLICATIONS

Extended European Search Report for European Application No. 14194619.4-1903 mailed May 21, 2015.

*Primary Examiner* — Yonel Beaulieu
(74) *Attorney, Agent, or Firm* — RatnerPrestia

(57) ABSTRACT

A damage recognition assist system of a vehicle, the system includes at least one vehicle camera adapted to provide a stream of camera frames including camera images of the vehicle's surrounding and of areas or parts of the vehicle's chassis; a monitoring unit adapted to detect an imminent interaction of the vehicle with an external object and to identify areas or parts of the vehicle's chassis possibly affected by the detected interaction; a comparison unit adapted to compare recent camera images of the possibly affected areas or parts of the vehicle's chassis with previous camera images of the same areas included in reference camera frames to determine the state and level of damage of the vehicle's chassis due to the detected interaction.

13 Claims, 3 Drawing Sheets

(51) Int. Cl.
  *H04N 1/21* (2006.01)
  *B60R 21/00* (2006.01)

(56) References Cited

U.S. PATENT DOCUMENTS

| | | | |
|---|---|---|---|
| 2007/0069920 A1* | 3/2007 | Hakki | G08G 1/0175 340/907 |
| 2011/0218825 A1 | 9/2011 | Hertenstein | |
| 2012/0286974 A1 | 11/2012 | Claussen | |
| 2014/0025252 A1 | 1/2014 | Lai | |
| 2014/0257627 A1 | 9/2014 | Hagan | |

* cited by examiner

DAMAGE RECOGNITION ASSIST SYSTEM

CROSS REFERENCE TO RELATED APPLICATIONS

This application claims priority to EP Patent Application No. EP14194619, filed Nov. 25, 2014, the contents of such applications being incorporated by reference herein.

FIELD OF THE INVENTION

The invention relates to a damage recognition assist system of a vehicle and to a method for performing a damage recognition of a damage of a vehicle's chassis.

BACKGROUND OF THE INVENTION

In many situations, a vehicle such as a car or a truck may collide with external objects. These objects can be immobile objects such as trees or mobile objects such as other vehicles or animals crossing the road. Often, a driver of the vehicle may hear a collision with an external object without having the possibility to inspect the impact on the vehicle's chassis. Especially, when driving the vehicle on a road, the driver of the vehicle has to concentrate on driving the vehicle and is not able to recognize and assess a damage caused by an object having collided with the vehicle. In some traffic situations, the driver may not be able to stop the car for an inspection of the vehicle damage. Even if the driver can stop the car, he is forced to leave the vehicle to inspect the vehicle's chassis for possible damages. Leaving the car for inspection may be risky in some traffic situations. Moreover, the driver leaving the vehicle for inspection may be exposed to bad weather conditions such as rain. Depending on the location and time of the collision, it may also be difficult for the driver to find the damaged area of the vehicle's chassis and to assess the state and level of damage caused by the collision. Especially at night or at a place with poor light conditions, it is difficult for the driver to find the impact area and to assess the damage. Moreover, some parts of the vehicle's chassis, especially the bottom part of the vehicle's chassis, cannot be reached easily by the driver for inspection. In case that the driver is able to find the affected area, he may be forced to take pictures of the damaged vehicle area to provide evidence of the caused damage and/or documenting the damage for later repair.

SUMMARY OF THE INVENTION

Accordingly, there is a need for a damage recognition assist system of a vehicle which recognizes damages caused to the vehicle's chassis and to assess the extent of the caused damage.

An aspect of the invention provides according to a first aspect a damage recognition assist system of a vehicle, said system comprising:
  at least one vehicle camera adapted to provide a stream of camera frames including camera images of the vehicle's surrounding and of areas or parts of the vehicle's chassis,
  a monitoring unit adapted to detect an imminent interaction of the vehicle with an external object and to identify areas or parts of the vehicle's chassis possibly affected by the detected interaction, and
  a comparison unit adapted to compare recent camera images of the possibly affected areas or parts of the vehicle's chassis with previous camera images of the same areas included in reference camera frames to determine the state and level of damage of the vehicle's chassis due to the detected interaction.

The damage recognition system according to the first aspect of the present invention allows to recognize and assess a damage caused by an interaction of the car with an external object automatically so that the driver can continue to drive the vehicle without being distracted. The driver is not forced to stop the vehicle for performing a damage inspection. This increases the safety of the driver as well as the safety of other traffic participants. Moreover, the assessment of the state and level of damage is performed on the basis of objective data and not according to the subjective assessment of a person.

In a possible embodiment of the damage recognition assist system according to the first aspect of the present invention, the damage recognition assist system further comprises a notification unit adapted to notify a driver of the vehicle about determined damaged areas and/or parts of the vehicle's chassis and/or other possibly affected components of the vehicle.

In a still further possible embodiment of the damage recognition assist system according to the first aspect of the present invention, a predetermined number of consecutive camera frames of the stream of camera frames provided by the at least one vehicle camera is stored periodically as reference camera frames in a memory.

In a still further possible embodiment of the damage recognition assist system according to the first aspect of the present invention, in response to a detected potential interaction with an external object and/or a detected collision with the external object camera images of the vehicle cameras are recorded for a predetermined time.

In a still further possible embodiment of the damage recognition assist system according to the first aspect of the present invention, the recorded camera images are processed by said monitoring unit to identify areas and/or parts of the vehicle's chassis and/or further components possibly affected by the detected interaction with the external object and/or to identify the external object's characteristics.

In a possible embodiment of the damage recognition assist system according to the first aspect of the present invention, the identified external object's characteristics comprise a speed, a size and/or a shape of the external object stored in a memory for further processing.

In a still further possible embodiment of the damage recognition assist system according to the first aspect of the present invention, the notification unit is adapted to display the recorded camera images of the determined damaged areas and/or parts of the vehicle's chassis.

In a still further possible embodiment of the damage recognition assist system according to the first aspect of the present invention, the monitoring unit is adapted to calculate an approximate speed and/or an approximate angle at which the external object collides with the vehicle's chassis.

In a still further possible embodiment of the damage recognition assist system according to the first aspect of the present invention, the identified characteristics of the external object and/or the recorded camera images are evaluated by said monitoring unit to assess the damage caused by the interaction with the external object.

An aspect of the invention further provides a method for performing a damage recognition of a damage of a vehicle's chassis.

According to a second aspect a method for performing a damage recognition of a damage of a vehicle's chassis, comprises the steps of:

detecting a potential interaction of the vehicle with at least one external object on the basis of camera images of the vehicle's surrounding; and comparing recent camera images of areas of the vehicle's chassis possibly affected by the detected interaction with previous camera images of the same areas included in reference camera images to determine a state and level of damage of the vehicle's chassis and/or further components due to the detected interaction.

In a possible embodiment of the method according to the second aspect of the present invention, the driver of the vehicle is notified about determined damaged areas and/or parts of the vehicle's chassis and/or other affected components of the vehicle.

In a still further possible embodiment of the method according to the second aspect of the present invention, a predetermined number of consecutive camera frames of the stream of camera frames provided by the at least one vehicle camera is stored periodically as reference camera frames in a memory.

In a further possible embodiment of the method according to the second aspect of the present invention, in response to a detected potential interaction with an external object and/or a detected collision with the external object camera images of the vehicle cameras are recorded for a predetermined time.

In a further possible embodiment of the method according to the second aspect of the present invention, the determined damaged areas and/or components of the vehicle's chassis are notified to the driver of the vehicle.

In a further possible embodiment of the method according to the second aspect of the present invention, the determined damaged areas and/or components are displayed using a three-dimensional vehicle model of the affected vehicle.

In a still further possible embodiment of the method according to the second aspect of the present invention, the external object is identified by evaluating the recorded camera images.

In a further possible embodiment of the method according to the second aspect of the present invention, an interaction of the vehicle with the external object is detected by evaluating sensor data comprising image data generated by at least one vehicle camera and/or sensor data of at least one collision sensor.

BRIEF DESCRIPTION OF THE DRAWINGS

In the following, possible embodiments of the different aspects of the present invention are described in more detail with reference to the enclosed figures.

DETAILED DESCRIPTION OF THE PREFERRED EMBODIMENTS

Figure 1:
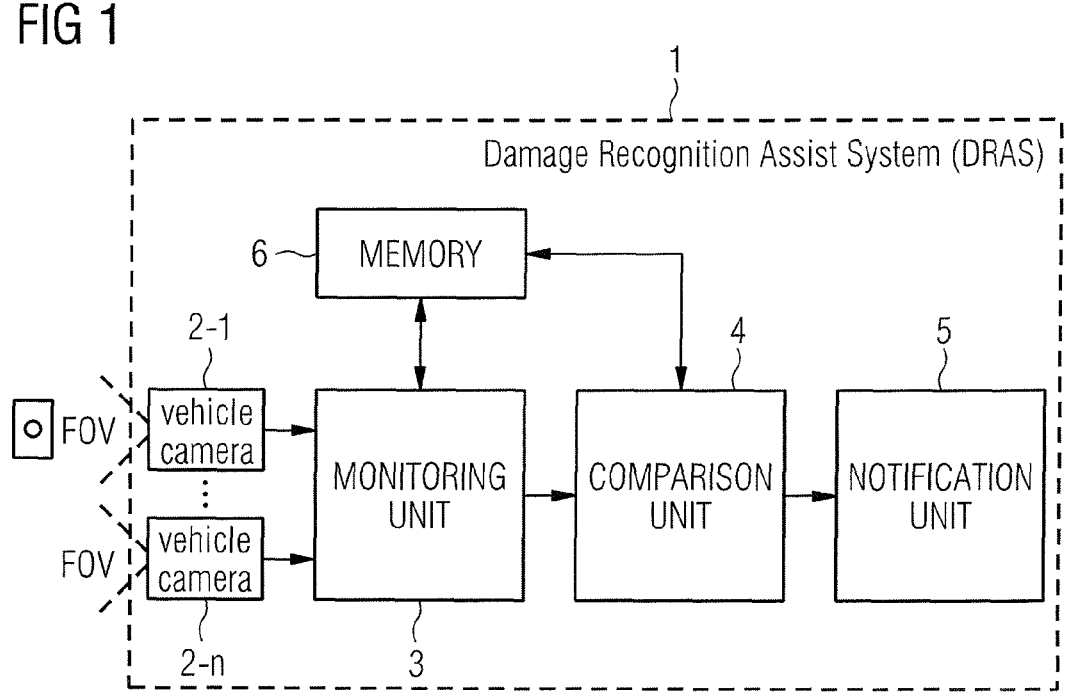
FIG. 1 shows a block diagram of a possible exemplary embodiment of a damage recognition assist system according to the first aspect of the present invention.

FIG. 1 shows a block diagram of a possible exemplary embodiment of a damage recognition assist system 1 according to the first aspect of the present invention.

The damage recognition assist system 1 can comprise one or several vehicle cameras 2-1, . . . 2-n as illustrated in FIG. 1. The number of vehicle cameras 2-i used by the damage recognition assist system 1 can vary. In a possible embodiment, the vehicle cameras 2-i are located in different sections of the vehicle's chassis. In a possible exemplary embodiment, the damage recognition assist system 1 can comprise four vehicle cameras located at the front, back and both sides of the vehicle's chassis. Each vehicle camera 2-i provides a stream of camera frames including camera images of the vehicle's surrounding and of areas or parts of the vehicle's chassis within a field of view FOV. The vehicle cameras can comprise fish-eye cameras having a wide field of view FOV. In a possible embodiment, the field of view FOV of each vehicle camera 2-i can be shifted. In a further possible embodiment, the vehicle camera 2-i can be adapted to zoom on an identified area of the vehicle's chassis. The damage recognition assist system 1 further comprises a monitoring unit 3 adapted to detect an imminent interaction of the vehicle V with an external object O and to identify areas or parts of the vehicle's chassis possibly affected by the detected interaction. The external object O as illustrated in FIG. 1 can be a mobile object such as another vehicle or an animal crossing the road. The external object can also be an immobile object such as a tree or a building. In the example illustrated in FIG. 1, the external object O is within the field of view FOV of the first vehicle camera 2-1. The monitoring unit 3 can detect an imminent interaction such as a collision of the vehicle V with the external object O and identify areas or parts of the vehicle's chassis possibly affected by the detected interaction.

The damage recognition assist system 1 further comprises a comparison unit 4 which is configured to compare recent camera images of the possibly affected areas or parts of the vehicle's chassis with previous camera images of the same areas included in reference camera frames to determine a state and level of damage of the vehicle's chassis due to the detected interaction. In the embodiment shown in FIG. 1, the damage recognition assist system 1 further comprises a notification unit 5 adapted to notify a driver of the vehicle V about determined damaged areas and/or parts of the vehicle's chassis and/or possibly affected components of the vehicle. In a possible embodiment, a predetermined number of consecutive camera frames of the stream of camera frames provided by the at least one vehicle camera 2-i is stored periodically as reference camera frames in a memory 6 of the damage recognition assist system 1. In response to a detected potential interaction with an external object O and/or a detected collision with the external object O, camera images of the vehicle cameras 2-i can be recorded for a predetermined time. The recorded camera images can be processed by the monitoring unit 3 to identify areas and/or parts of the vehicle's chassis and/or further components possibly affected by the detected interaction with the external object O and/or to identify the external object's characteristics. The further components may comprise electronic or mechanic components, in particular those components which are located in the vicinity of the detected collision.

The recorded camera images stored in the memory 6 can be processed by the monitoring unit 3 to identify the external object's characteristics comprising a speed, a size and/or a shape of the external object O. In a possible embodiment, the external object O can be identified by evaluating the recorded camera images. In a possible embodiment, the monitoring unit 3 evaluates the recorded camera images to identify the external object O having interacted or collided with the vehicle V. The identified external object O can be an immobile object such as a tree or a traffic sign but also a mobile object, for instance another vehicle or an animal having crossed the road. In a still further possible embodiment, not only the type of the external object O is identified, but also the individual object is identified for instance by recognizing a license or a number plate of another vehicle. In a possible embodiment, the monitoring unit 3 performs a character recognition algorithm to identify a number plate of another vehicle shown in the recorded camera images. The recognized identification number of the external object O can also be memorized in the memory 6 for further use. In a possible embodiment, the interaction of the vehicle V with the external object O is detected by the monitoring unit 3 by evaluating sensor data comprising image data generated by the at least one vehicle camera 2-$i$ and/or by evaluating sensor data of at least one collision sensor provided in the vehicle V. After an imminent or potential interaction has been detected, camera images of all available vehicle cameras 2-$i$ are recorded for a predetermined period of time. Then, the comparison unit 5 compares the recorded recent camera images of the possibly affected areas or parts of the vehicle's chassis with previous camera images of the same areas included in reference camera frames to determine a state and level of damage of the vehicle's chassis due to the detected interaction. The determined damaged area and/or components of the vehicle's chassis are notified to the driver of the vehicle V by means of the notification unit 5. In a possible embodiment, the determined damaged areas and/or components are displayed using a three-dimensional vehicle model of the affected vehicle V. In a possible embodiment, the assessment of the caused damage is performed by the comparison unit 4. In a possible embodiment, the damage is assessed in a combination of two ways. The damage can be calculated by evaluating the speed of collision and the characteristics of the identified external object O. In a possible embodiment, the damage can be categorized into different levels of damage, for instance in one or three categories comprising low damage, medium damage and high damage. The damage can also be assessed by using the current image of the affected area and the reference images of the same areas. In a possible embodiment, the damage recognition assist system 1 can also evaluate depending on the identified damage level, whether the vehicle V can continue to drive. In a possible embodiment, the damage recognition assist system 1 is also configured to identify specific parts of the vehicle's chassis affected by the interaction and notify corresponding part numbers of the affected parts which can be used as information for a repair shop repairing the vehicle's chassis. In a possible embodiment, the damage recognition assist system 1 can use the vehicle cameras 2-$i$ provided for a surround view system of a driver assistance system. In a possible embodiment, a three-dimensional animated vehicle model and a flashing red zone can be displayed to indicate the recognized damages of the vehicle's chassis to the driver. The driver can be informed about the area where the vehicle V has been hit or damaged. In a possible embodiment, the notification unit 5 can output an audible and/or visible warning as well as a message on a screen stating that a damage has been detected. In a possible embodiment, following the audible or visible warning and graphical notifications on the screen a short video recording of the incident can be displayed to the driver. In a possible embodiment, a video recording of the collision or interaction can be displayed to the driver. The displayed video can additionally display a vehicle's speed, an approximate speed of the struck external object O and a possible live image of the damaged area of the vehicle V. The notification unit 5 can further notify the driver whether the external object O could be successfully identified. In a possible embodiment, the notification unit 5 informs the driver about the type of the external object O having struck the vehicle V. In a possible embodiment, the driver will further receive via a loudspeaker a voice message informing the driver about the level of damage and giving advice how to further proceed. If the collision caused such a high damage that further driving of the vehicle V is not safe the driver can be instructed to stop the vehicle V. The notification unit 5 can be further configured to inform the driver about the next available repair shop for repairing the caused damage. The recorded available data of the interaction can be stored in the memory 6 and be read out via a data interface of the damage recognition assist system 1. In a possible embodiment, the memory 6 can be formed by a replaceable memory card. The stored data of the incident can be used as evidence by the police and/or insurance company.

Figure 2:
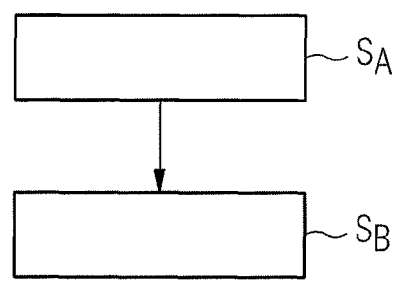
FIG. 2 shows a flowchart for illustrating the main steps of the method according to the second aspect of the present invention.

FIG. 2 shows a simple flowchart of a possible exemplary embodiment of a method according to the second aspect of the present invention. FIG. 2 shows the main steps of the method for performing damage recognition of a damage of a vehicle's chassis according to the second aspect of the present invention. In a first step $S_A$, a potential interaction of the vehicle V with at least one external object O is detected on the basis of camera images of the vehicle's surrounding. In a further step $S_B$, recent camera images of areas of the vehicle's chassis possibly affected by the detected interaction are compared with previous camera images of the same areas included in reference camera images to determine a state and level of damage of the vehicle's chassis and/or further components due to the detected interaction. The driver of the vehicle V can then be notified about the determined damaged areas and/or parts of the vehicle's chassis and/or other affected components of the vehicle.

Figure 3:
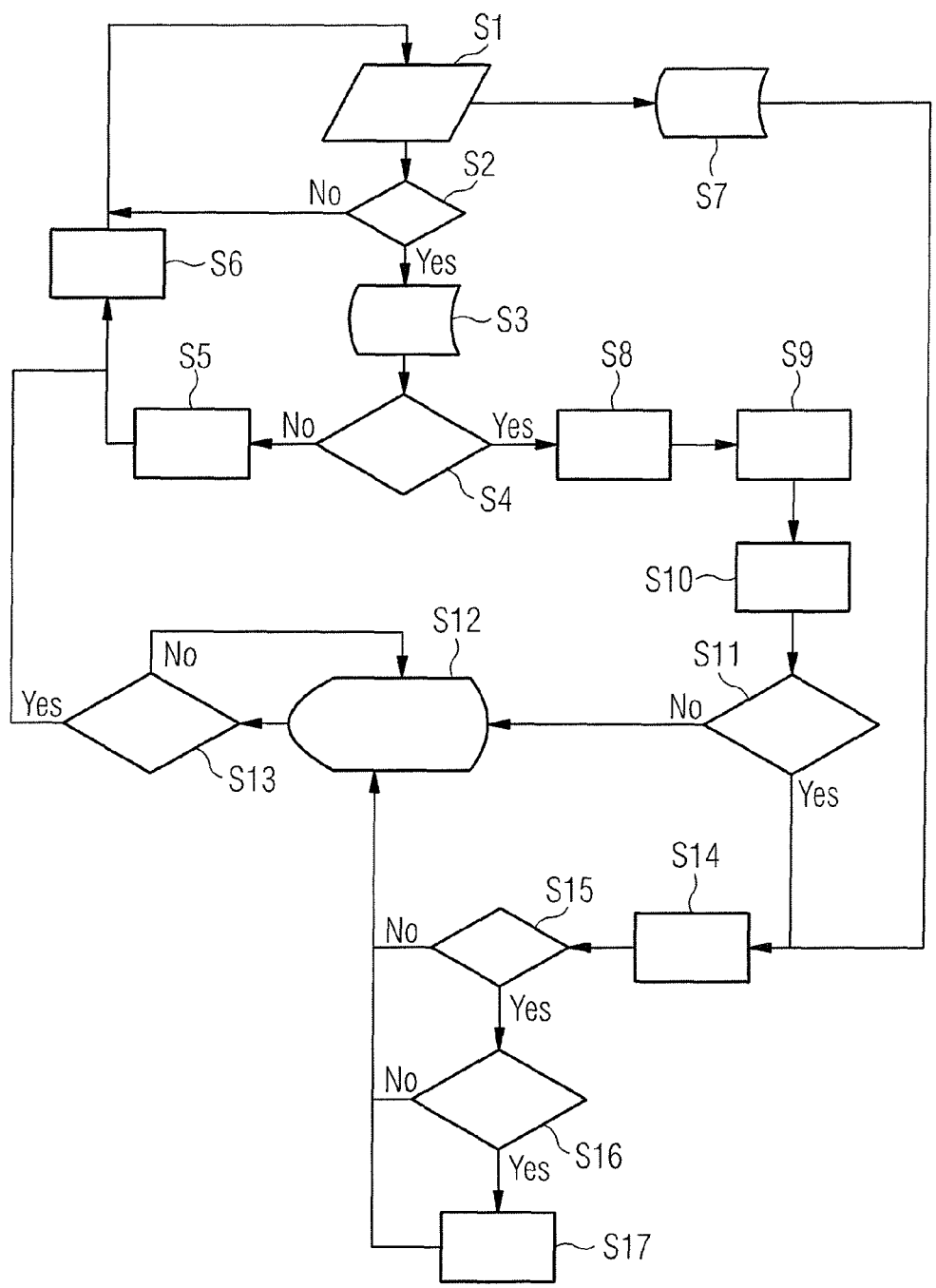
FIG. 3 shows a detailed flowchart of a possible exemplary embodiment of the method according to the second aspect of the present invention.

FIG. 3 shows a more detailed flowchart for illustrating a further exemplary embodiment of the method according to the second aspect of the present invention. In a first step S1, camera frames are streamed from all vehicle cameras 2-$i$ to the monitoring unit 3. If in step S2 a potential threat is identified, all available frames are recorded in step S3. A potential threat can be identified by using an object detection algorithm that identifies objects approaching and/or being approached by the vehicle V that satisfy certain speed and distance criteria. If no potential threat is identified in step S2, the routine returns to step S1. In a further step S4, it is evaluated, whether the external object O has interacted with the vehicle V. If it is assumed that the object O has not interacted with the vehicle, the recording is stopped in step S5 and a reset is performed in step S6, where the recorded frames with the exception of two consecutive frames are deleted. Then, the routine returns to step S1, where the frames are streamed from the vehicle cameras 2-$i$. A predetermined number of consecutive frames of the stream of camera frames provided by the at least one vehicle camera is stored periodically as reference camera frames in a memory in step S7. For example, every five minutes, two consecutive frames from each camera are saved and stored as reference camera frames in the memory 6 of the damage recognition assist system 1.

If in step S4 it is assumed that the external object O has interacted or collided with the vehicle, the recording can be continued for a predetermined period of time. In response to the detected potential interaction with the external object O and/or the detected collision with the external object O, the camera images of the vehicle cameras 2-$i$ are recorded for a predetermined time, for example for another second in step S8. The recorded camera images can be processed by the monitoring unit 3 to identify the external object's characteristics in step S9. The identified external object's characteristics can for instance comprise a speed, size and/or a shape of the external object O. The object's characteristics as identified in step S9 can also be memorized in the memory 6 of the damage recognition assist system 1. In a further step S10, it is identified which part and/or area of the vehicle's chassis may have been affected by the interaction or collision. In a further step S11, it can be decided, whether there are any of the possibly affected areas within the system's vision area. If the affected areas are not visible to the vehicle cameras 2-*i*, an appropriate system output is displayed to the driver in step S12. The system output can include a three-dimensional graphical representation of the vehicle V where the suspected affected areas are highlighted. This system output is displayed as long as the driver has not approved to a reset. If in step S3 it is found that the driver has approved a reset of the data in step S13, a reset is performed in step S6 with the exception of deleting two consecutive frames. If in step S11 it is found that the possibly affected areas of the vehicle's chassis are within the system's vision, the most recent frames are compared with the reference frames in step S14 to identify changes and/or possible damages on the vehicle. If it is decided in step S15 that changes could be found or identified, it is evaluated in step S16, whether the changes match the object's characteristics, in particular its speed, size and/or shape. If the identified object's characteristics match the identified changes, the caused damage is assessed in step S17. The caused damage will be notified by the notification unit 5 to the driver. The system output will be displayed to the driver in step S12 until reset. Data can be stored before restarting to retain the information for later use.

The output of the notification unit 5 can include a three-dimensional graphical representation of the vehicle with the identified affected damaged areas and further information about the caused damage. The further information can comprise the type of the identified object O and further information about the identified object's characteristics. Further, the notification unit 5 can display a categorized damage assessment indicating whether the caused damage is high, medium or low. The notification unit 5 can further notify the driver, whether he has to stop the car for safety reasons. In a further possible embodiment, the driver can be informed about the affected part of the vehicle's chassis indicating a part number of a vehicle part to be repaired or to be replaced. The notification unit 5 can further notify the driver about the next location of a repair shop where the necessary repair can be performed. In a possible embodiment, a navigation system of the vehicle V can provide the necessary coordinates of the repair shop and assist the driver in reaching the repair shop. If the interaction or collision of the vehicle V was with another vehicle or a traffic participant, the notification unit 5 can further inform the driver, whether it was possible to identify a plate number and an identification number of the other vehicle. In case that the identification number of the other vehicle could be extracted from the recorded images, the identification number of the other vehicle can also be displayed on a display of the notification unit 5. All available data about the collision or interaction can be recorded in the memory 6 of the damage recognition assist system 1. This data can comprise sensor data including image data generated by at least one vehicle camera 2-*i* and sensor data of other sensors of the vehicle, in particular collision sensors. After an interaction or collision, the driver may stop the vehicle V and look at a video illustrating the collision and the extracted further information, in particular the identified object's characteristics.

Figure 4:
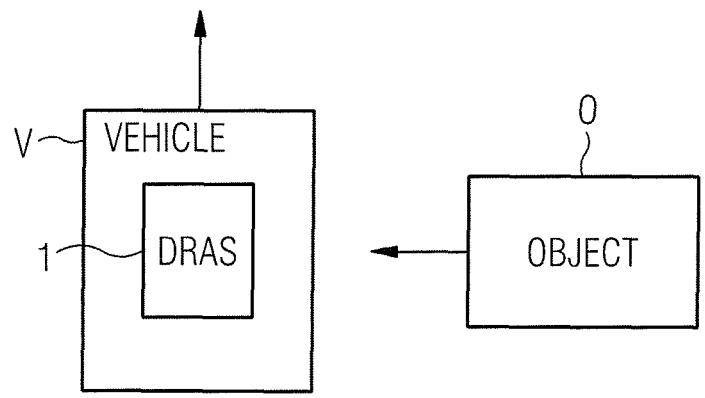
FIGS. 4, 5 show diagrams for illustrating the operation of the damage recognition assist system according to the present invention.
Figure 5:
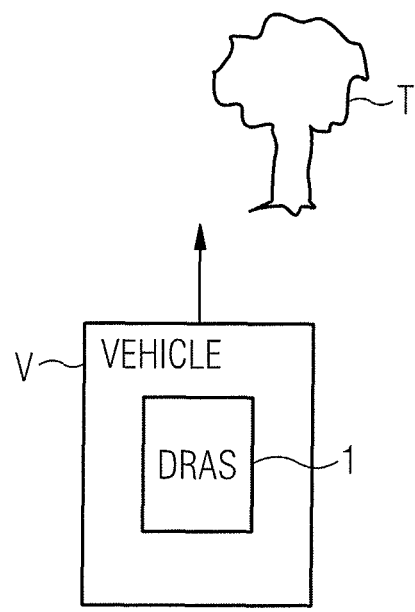

FIG. 4 illustrates a possible situation, wherein an external object O is formed by a mobile object such as another vehicle colliding with the right side of a vehicle's chassis. The damage recognition assist system 1 of the vehicle V is configured to recognize and assess the damage caused by this collision. FIG. 5 shows a situation where the vehicle V collides with an immobile object such as a tree T. The vehicle V illustrated in FIGS. 4, 5 can be a land vehicle comprising a truck or a car. In a further possible embodiment, the vehicle V can also be a water vehicle comprising a ship. The damage recognition assist system 1 according to the present invention can employ further sensors for detecting and evaluating the interaction with the external object O such as laser scanners or radar sensors.

The invention claimed is:

1. A damage recognition assist system of a vehicle, said system comprising:
   at least one vehicle camera adapted to provide a stream of camera frames including camera images of the vehicle's surrounding and of areas or parts of the vehicle's chassis;
   a monitoring unit adapted to detect an imminent interaction of the vehicle with an external object and to identify areas or parts of the vehicle's chassis possibly affected by the detected interaction;
   a comparison unit adapted to compare recent camera images of the possibly affected areas or parts of the vehicle's chassis with previous camera images of the same areas included in reference camera frames to determine the state and level of damage of the vehicle's chassis due to the detected interaction; and
   a notification unit adapted to notify a driver of the vehicle about determined damaged areas and/or parts of the vehicle's chassis and/or other possibly affected components of the vehicle,
   wherein determined damaged areas and/or components of the vehicle's chassis are displayed using a three-dimensional vehicle model of the affected vehicle where the suspected affected areas and/or components are highlighted, and/or
   wherein the notification unit notifies the driver whether the vehicle should be stopped for safety reasons.

2. The damage recognition assist system according to claim 1, wherein a predetermined number of consecutive camera frames of the stream of camera frames provided by the at least one vehicle camera is stored periodically as reference camera frames in a memory.

3. The damage recognition assist system according to claim 1, wherein in response to a detected potential interaction with an external object and/or a detected collision with the external object camera images of the vehicle cameras are recorded for a predetermined time.

4. The damage recognition assist system according to claim 3, wherein the recorded camera images are processed by said monitoring unit to identify areas and/or parts of the vehicle's chassis and/or further components possibly affected by the detected interaction with the external object and/or to identify the external object's characteristics.

5. The damage recognition assist system according to claim 4, wherein the identified external object's characteristics comprise a speed, a size and/or a shape of the external object stored in a memory for further processing.

6. The damage recognition assist system according to claim 1, wherein the notification unit is adapted to display the recorded camera images of the determined damaged areas and/or parts of the vehicle's chassis.

7. The damage recognition assist system according to claim 1, wherein the monitoring unit is adapted to calculate an approximate speed and/or an approximate angle at which the external object collides with the vehicle's chassis.

8. The damage recognition assist system according to claim 4, wherein the identified characteristics of the external object and/or the recorded camera images are evaluated by said monitoring unit to assess the damage caused by the interaction with the external object.

9. A method for performing a damage recognition of a damage of a vehicle's chassis, said method comprising:
(a) detecting a potential interaction of the vehicle with at least one external object on the basis of camera images of the vehicle's surrounding; and
(b) comparing recent camera images of areas of the vehicle's chassis possibly affected by the detected interaction with previous camera images of the same areas included in reference camera images to determine a state and level of damage of the vehicle's chassis and/or further components due to the detected interaction,
wherein the driver of the vehicle is notified about determined damaged areas and/or parts of the vehicle's chassis and/or other affected components of the vehicle,
wherein the determined damaged areas and/or components are displayed using a three-dimensional vehicle model of the affected vehicle, and/or
wherein the driver is notified whether the vehicle should be stopped for safety reasons.

10. The method according to claim 9, wherein a predetermined number of consecutive camera frames of the stream of camera frames provided by the at least one vehicle camera is stored periodically as reference camera frames in a memory.

11. The method according to claim 9, wherein in response to a detected potential interaction with an external object and/or a detected collision with the external object camera images of the vehicle cameras are recorded for a predetermined time.

12. The method according to claim 9, wherein the external object is identified by evaluating the recorded camera images.

13. The method according to claim 9, wherein an interaction of the vehicle with the external object is detected by evaluating sensor data comprising image data generated by at least one vehicle camera and/or sensor data of at least one collision sensor.

* * * * *